United States Patent [19]

Root

[11] 4,277,078

[45] Jul. 7, 1981

[54] THREE-WHEEL CONVEYANCE

[76] Inventor: Myron A. Root, P. O. Box 398, Milroy, Ind. 46156

[21] Appl. No.: 14,106

[22] Filed: Feb. 22, 1979

[51] Int. Cl.³ .......................... B62K 5/02; B62K 5/08
[52] U.S. Cl. ................................ 280/269; 280/95 R; 280/281 R
[58] Field of Search ............. 280/269, 268, 269, 95 R; 180/210, 209

[56] References Cited

U.S. PATENT DOCUMENTS

| | | | |
|---|---|---|---|
| 415,740 | 11/1889 | Sharp | 280/282 |
| 561,330 | 6/1896 | Ljungstrom | 280/269 |
| 609,237 | 8/1898 | Monnot | 280/269 |
| 1,092,910 | 4/1914 | Harley | 280/269 |
| 2,890,892 | 6/1959 | Strehlow | 280/95 R |
| 3,429,584 | 2/1969 | Hendricks | 280/269 |
| 3,447,623 | 6/1969 | Hott | 280/95 R |
| 3,561,778 | 2/1971 | La Brie | 280/269 |
| 3,836,177 | 9/1974 | Heidt | 280/269 |
| 3,913,929 | 10/1975 | Matsuura | 280/269 |
| 4,070,032 | 1/1978 | Cunningham | 280/269 |
| 4,088,199 | 5/1978 | Trautwein | 180/210 |
| 4,158,397 | 6/1979 | Reynolds | 180/210 |

FOREIGN PATENT DOCUMENTS 357548 12/1905 France ................................. 280/267

OTHER PUBLICATIONS

Gobby Mfg. Inc. Advertisement, *Bicycle Journal*, Nov. 1978.

Primary Examiner—John P. Silverstrim

[57] ABSTRACT

A conversion kit for converting a two-wheel conveyance, such as a bicycle, into a three-wheel conveyance includes a connecting member which provides two wheel fork assemblies equally spaced on opposite sides of the plane of the rear wheel, a center steering member having two arms arranged in a "V" shape and being attached to the center post of the bicycle and supporting the handlebars, and two four-bar linkage arrangements each including an arm, a rod member and a link member, one such four-bar linkage being coupled to each wheel fork assembly. The two linkages couple turning movement of the handlebars into turning movement of the front steering wheels wherein the front steering wheel to the inside of the turning path of the conveyance is turned through a greater angle than the front steering wheel to the outside of the turning path for the same amount of turning movement of the center steering member.

6 Claims, 8 Drawing Figures

THREE-WHEEL CONVEYANCE

BACKGROUND OF THE INVENTION

This invention relates in general to means of conveyance and in particular to self-propelled three-wheel means such as tricycles.

Although bicycles represent a very common, practical and enjoyable self-propelled means of conveyance, the fact that such conveyances have only two wheels requires a certain degree of balancing ability in order to utilize this type of conveyance. Almost everyone is, at some point in life, able to enjoy bicycling, yet elderly persons and those with certain disabilities have found that three-wheel conveyances are more suitable to their needs and abilities. Of course, tricycles are well known in the art and the type used by children have a front wheel used for both steering and driving with a pair of rear wheels for stability and balance. This type of conveyance is typically quite small and thus unacceptable for adults to use. Therefore, it would be an improvement to such conveyances in general if there was a way to convert a regularly sized adult bicycle into a suitably sized tricycle which would thus be of a size and an arrangement appropriate for use by adults. A further improvement would be to retain the rear, chain-driven wheel and add a new third wheel as a second front steering wheel. This arrangement would provide greater stability and easier powering of the conveyance by means of pedaling than would a tricycle of the more conventional arrangement wherein there is only one front steering and drive wheel and two rear wheels.

Among the considerations relating to such a three-wheel conveyance and the nature of the conversion kit for converting a bicycle into such a conveyance are the ease of modifying the bicycle and the overall cost of doing so. One factor associated with the overall cost is how much of the existing bicycle can be used and how many new parts must be provided in order to create the three-wheel conveyance.

Among the design considerations for two front steering wheels is their positional relationship to each other and to the rear drive wheel as well as how to connect these front wheels to a steering means such as handlebars, so that the wheels turn in different degrees, depending on whether the particular wheel is to the inside or to the outside of the selected turning path.

SUMMARY OF THE INVENTION

A conversion kit for converting a two-wheel conveyance, such as a bicycle, into a three-wheel conveyance having a single rear drive wheel, two front steering wheels and a frame connecting these three wheels together comprises a connecting member including two wheel-fork assemblies joined together, each wheel fork assembly being suitably arranged for connection to a bicycle wheel axle and each including a top stem fitted with a pivot link, a center steering member suitably arranged for connection to steering means and for connection to the frame and two rod members, each rod member having a pivotal mechanical connector at each end, one of the rod members connecting the central steering member to the pivot link of one wheel fork assembly and the other rod member connecting the central steering member to the pivot link of the other wheel fork assembly, wherein the front steering wheel to the inside of the turning path of the conveyance is turned through a greater angle than the front steering wheel to the outside of the turning path for the same amount of turning movement of the central steering member.

One object of the present invention is to provide an improved means of converting a bicycle into a three-wheel conveyance.

Related objects and advantages of the present invention will be apparent from the following description.

DESCRIPTION OF THE PREFERRED EMBODIMENT

Figure 1:
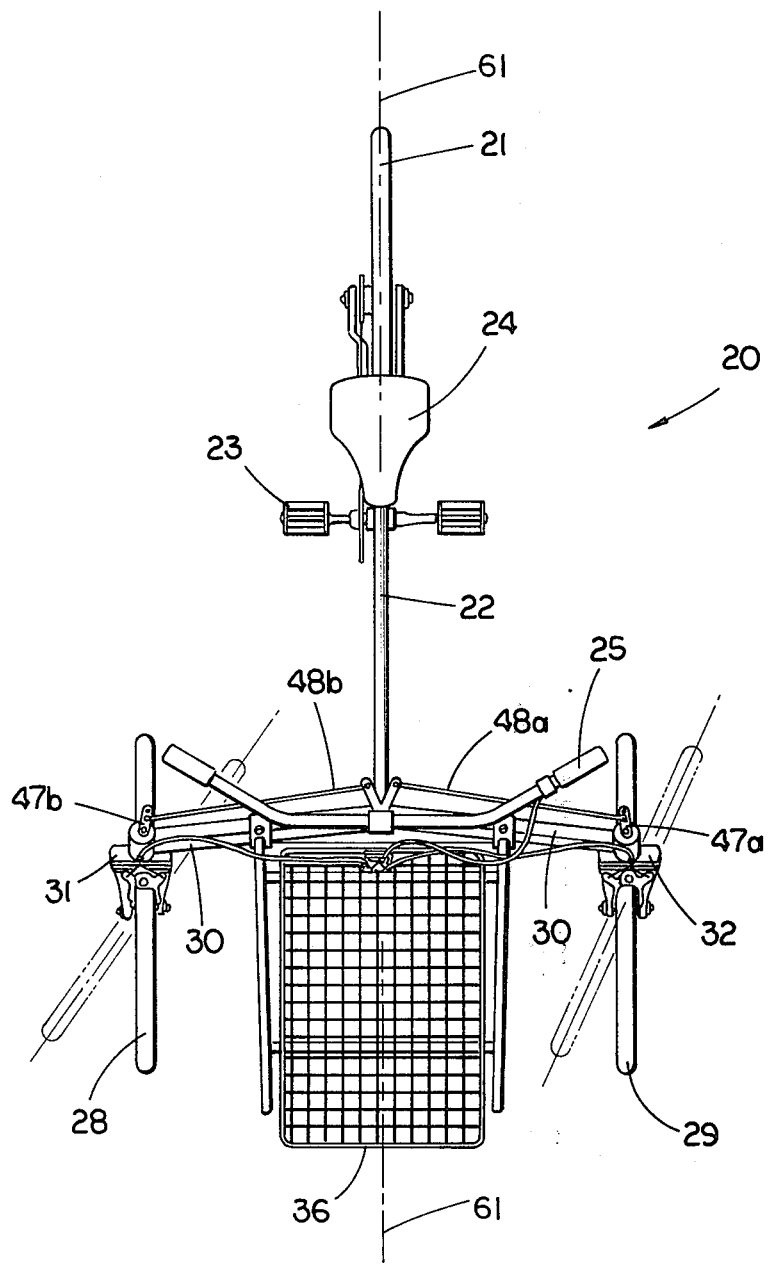
FIG. 1 is a plan view of a bicycle which has been converted into a three-wheel conveyance by means of a conversion kit according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
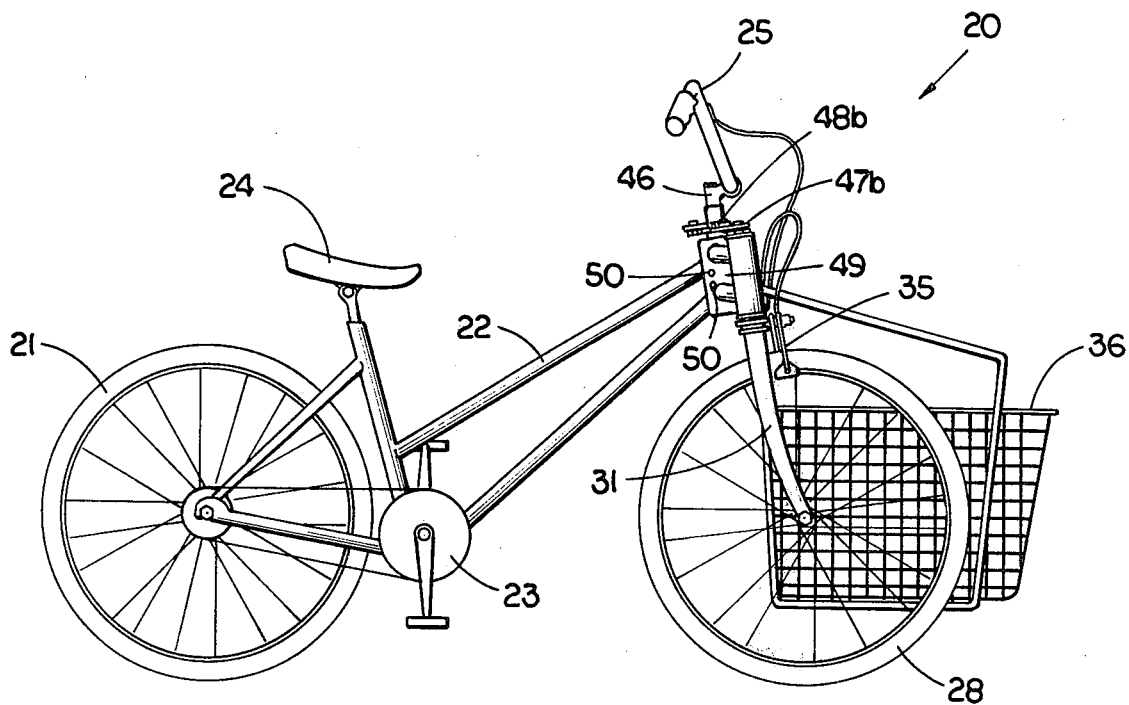
FIG. 2 is a side elevation view of the FIG. 1 three-wheel conveyance.
Figure 3:
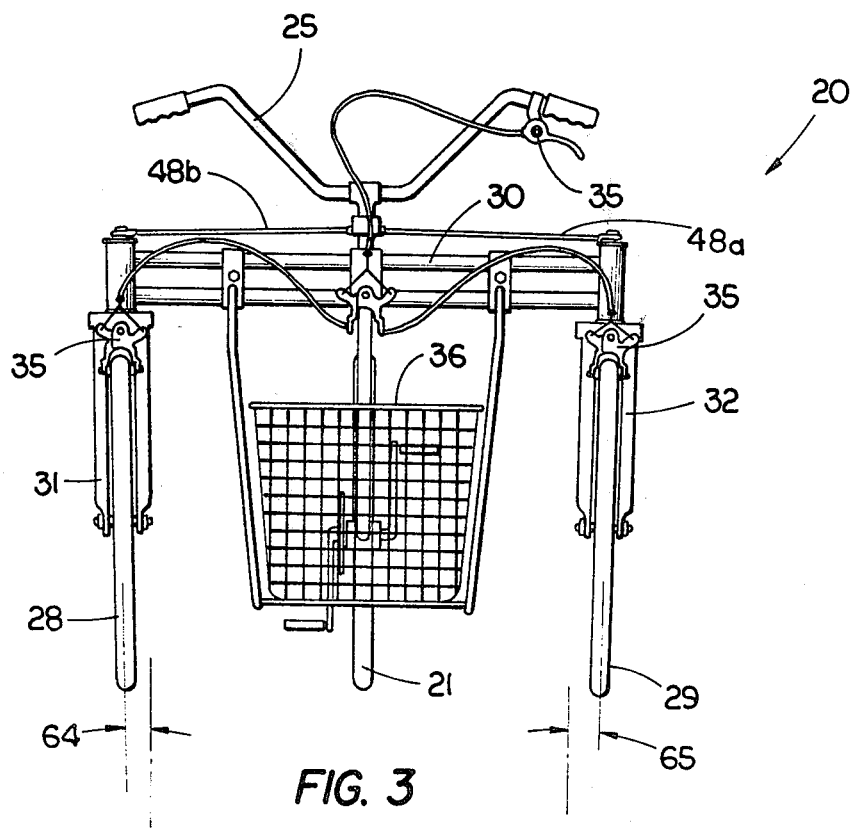
FIG. 3 is a front elevation view of the FIG. 1 three-wheel conveyance.

Referring to FIGS. 1, 2 and 3, there is illustrated a three-wheel conveyance 20 which includes conventional bicycle components such as rear drive wheel 21, frame 22, chain drive and pedal assembly 23, seat 24 and handlebars 25. The illustrated conveyance is created by conversion of a bicycle wherein one of the two front steering wheels 28 and 29 is the bicycle front wheel and a new connecting member 30 is added to provide two wheel fork assemblies 31 and 32 in a rigidly coupled and properly spaced arrangement. These two wheel fork assemblies attach to the axle of the respective front wheels 28 and 29 in a conventional manner for wheel forks using conventional attaching hardware. A second front wheel must be added to the original bicycle equipment as well as some type of steering linkage in order to create the three-wheel conveyance which is illustrated in the various figures and described herein. Each of the original bicycle wheels as well as the added wheel include a conventional axle and bearing arrangement. Each axle constitutes the axis of rolling motion for its corresponding wheel. The steering linkage is required in order to couple turning movement of the handlebars 25 into turning movement of the respective front steering wheels 28 and 29.

Figure 7:
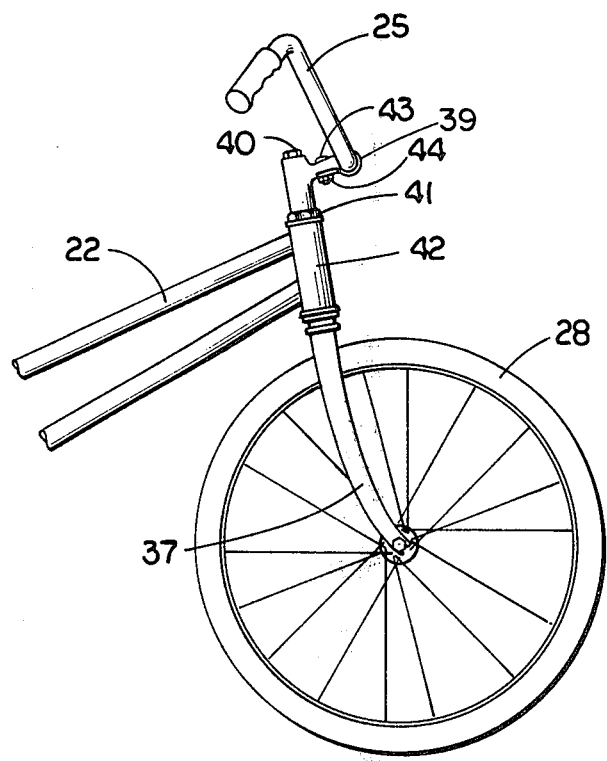
FIG. 7 is a partial side elevation view of a bicycle including center post and handlebar bracket.

As is illustrated, conveyance 20 may also be fitted with a front wheel hand brake assembly 35 and a cargo basket 36. However, such equipment is optional in that reverse direction braking by means of chain drive and pedal assemblies is well known in the art and cargo hauling is not always required. Conveyance 20 utilizes most of the prior bicycle component parts with the exception of the bicycle front wheel fork 37 (see FIG. 7) and the handlebar bracket 39 which are not required as part of the conversion. In order to prepare the bicycle for the conversion to a three-wheel conveyance, bolt 40 and nut 41 are loosened and removed and wheel fork 37 is removed from center post 42. Next bolt 43 and nut 44 are loosened and the handlebars are removed from the handlebar bracket 39. Finally, wheel 28 is removed from front wheel fork 37. The bicycle is now arranged at the front end with only center post 42 and this center post provides the connection between those items added by the conversion kit and the remaining portions of the original bicycle. Also at this point in the conversion process, the handlebars 25 and front wheel 28 are loose items awaiting utilization as part of the conversion.

Figure 4:
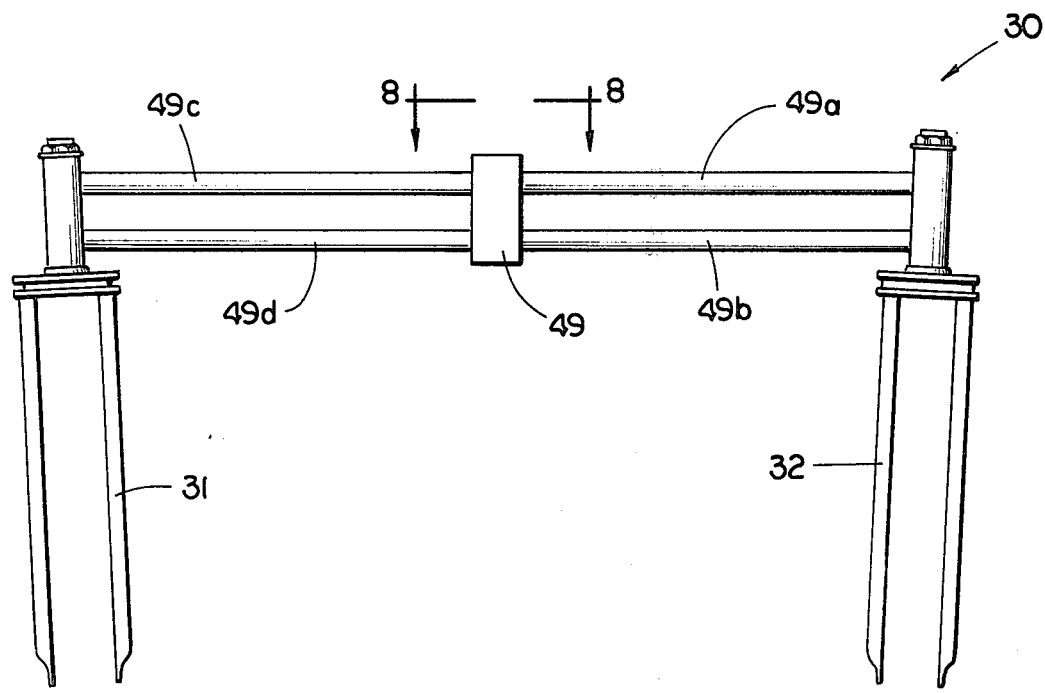
FIG. 4 is a front elevation view of a connecting member including two wheel fork assemblies and comprising one element of the FIG. 1 conversion kit.
Figure 8:
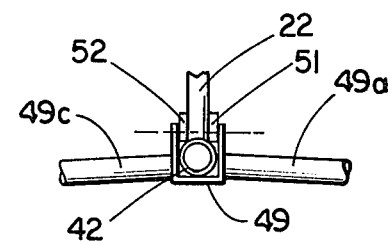
FIG. 8 is a partial plan view of the FIG. 4 connecting member as taken along line 8—8 in FIG. 4.
Figure 5:
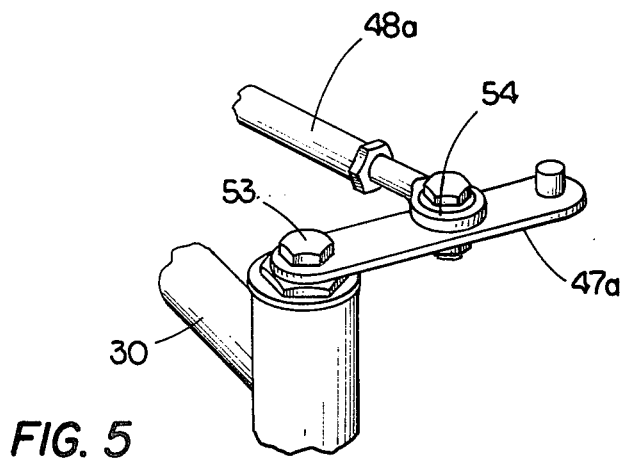
FIG. 5 is a partial perspective view of a rod member and coupling link comprising other elements of the FIG. 1 conversion kit.
Figure 6:
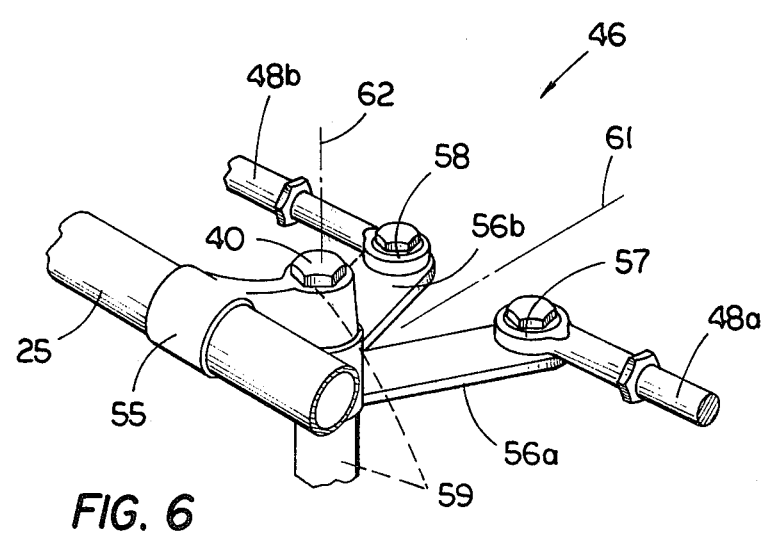
FIG. 6 is a perspective view of a center steering member coupled to the FIG. 5 rod members and comprising yet another element of the FIG. 1 conversion kit.

The conversion kit includes connecting member 30 (see FIG. 4), center steering member 46 (see FIG. 6), two link members 47a and 47b (see FIG. 5), and two rod members 48a and 48b (see FIGS. 5 and 6). These component parts are arranged in combination with center post 42 such that the sides of U-shaped portion 49 of connecting member 30 are bolted together around center post 42 by means of bolts 50. Positioned between, yet slightly rearwardly of, the sides of U-shaped portion 49 are two rectangular spacers 51 and 52 (see FIG. 8). These two spacers extend for substantially the full height of portion 49 and include two clearance holes each in order to receive bolts 50. These spacers act to anchor connecting member 30 to center post 42 and frame 22. Although FIG. 8 is correctly a view of only member 30, additional parts have been added for greater clarity of the assembly details. The broken line illustrates the axis of bolts 50. This arrangement rigidly secures the connecting member 30 to the remainder of frame 22 and properly orients the two wheel fork assemblies 31 and 32. Each wheel fork assembly is connected to U-shaped portion 49 by means of bars 49a, 49b, 49c and 49d. These bars maintain the proper symmetrical spacing of the two wheel fork assemblies with respect to U-shaped portion 49 and provide the overall rigidity and durability which is desirable for such types of conveyance construction. The next step is to attach steering member 46 to the interior of center post 42 by means of bolt 40. In the event the style of bicycle being converted is such that bolt 40 is not of sufficient length to be reused as part of the conversion, a replacement bolt is provided as part of the conversion kit as well as other miscellaneous hardware items which may be required for such things as attaching wheels to the wheel fork assemblies and the handlebars to center steering member 46.

Each wheel fork assembly 31 and 32 is constructed similar to the original center post and front steering wheel fork assembly of the bicycle before the conversion takes place and an itemized breakdown of the included hardware involved with each wheel fork assembly is not believed to be necessary. One difference which is noted is that a center bolt 53 is used on each wheel fork assembly in order to secure the corresponding link member 47a, 47b to the top of the center pivot stem of its corresponding wheel fork assembly in a particular desired orientation. This particular orientation is controlled by the lengths and orientations of the other linkage members. Spaced apart from the attachment location of bolt 53 for each link member is a second connection 54, this connection being between the link members 47a and 47b and the corresponding rod members 48a and 48b. Although FIG. 5 only illustrates the left side wheel fork assembly 32 and its connection (left side reference being based on the rider forward facing), the same is to be assumed for the opposite side. Each connection 54 is a spherical connector such that tolerance differences and dimensional mismatches are accommodated for and yet smooth turning and pivotal motion is still provided to each wheel fork assembly 31 and 32 by means of these corresponding rod members 48a and 48b which are disposed in a substantially horizontal orientation (see FIG. 3).

Center steering member 46 is arranged to include a handlebar bracket portion 55 and two arms 56a and 56b for connection to rod members 48a and 48b, respectively. This connection is accomplished by means of spherical connectors 57 and 58. A neutral position of the three-wheel conveyance is defined as that position wherein the front two steering wheels 28 and 29 are parallel to each other and parallel to the plane of rear drive wheel 21. In this neutral position, arms 56a and 56b are oriented symmetrically about centerline 61 and the angular separation of these two arms is 50 degrees. Centerline 61 coincides with the plane of rear drive wheel 21 as well as of frame 22. The combination of arm 56a, rod member 48a, link member 47a and rods 49a and 49b comprise a four-bar linkage arrangement and a similar four-bar linkage arrangement is provided by corresponding members on the opposite side of U-shaped bracket 49.

Once connecting member 30 is attached to frame 22, center steering member 46 is attached to center post 42 and link members 48a and 48b are coupled to the various spherical connectors 54, 57 and 58. Next, the front steering wheels 28 and 29 and handlebars 25 are assembled. While wheel 28 is reused from the disassembled bicycle, second wheel 29 must be included either as part of the conversion kit or provided separately. While it is envisioned that the kit should include wheel 29 and such is the case in the exemplary embodiment, it is important to recognize an alternative as an option. Since a single style conversion kit is acceptable for various wheel diameters, except for the size of the wheel provided, the alternative conversion kit includes all of the parts heretofore described except for the wheel. The instructions for conversion then state that a second front steering wheel must be provided by the user. This second wheel is then selected so as to be identical to wheel 28 which was part of the original bicycle. This alternative form of the conversion kit enables the same structural members to be provided without consideration of the specific wheel diameter. Another option for the conversion kit is to include the necessary hand brakes 35 for the two front steering wheels and if such brakes are to be used, their assembly constitutes the next conversion step.

One important aspect of the design of center steering member 46 is the angular "V" shape of arms 56a and 56b. As the handlebars are turned for steering, these arms move through a corresponding angle about pivot point 62 which coincides with the longitudinal axis of bolt 40. Steering member 46 is provided with a center clearance aperture 59 and it is through this aperture into center post 42 that bolt 40 extends. For a given amount of turning movement of member 46 by means of handlebars 25, the linkage arrangement consisting of arm 56a, rod member 48a and link member 47a results in a first amount of steering movement to wheel 29. However, for this same amount of turning movement of member 46, the linkage arrangement consisting of arm 56b, rod member 48b and link member 47b results in a second amount of steering movement to wheel 28, this second amount of steering movement being different from the first amount of steering movement to wheel 29. This differential movement of the two wheels is the result of the design of center steering member 46 and the different horizontal and vertical vectors associated with the movement of each arm 56a, 56b about pivot point 62. Although there is a difference between the degree of steering movement of each wheel, there is also a certain relationship which is preserved regardless of the direction or amount of handlebar turning. This relationship is that the wheel which is to the inside of the turning path (closest to the center of the turn) is turned through a greater angle than the wheel which is to the outside of the steering path. The relationship also includes the result that the two front steering wheels are only parallel to each other at one unique position, that being the neutral position when they are parallel to centerline 61. With any turning of the handlebars from this neutral position, these two wheels sweep concentric circles, or at least concentric part-circular paths. The center of the concentric circles also coincides with the intersection of the axis of rotation lines (coinciding with the axles) of wheels 28 and 29. With these two front steering wheels being equidistant from centerline 61, it should be clear that rear drive wheel 21 tracts a path between these two concentric circles (or parallel lines) of wheels 28 and 29.

Although the two arms 56a and 56b define an included angle of 50 degrees in the exemplary embodiment, it is to be understood that it is the dimensions and angular orientation of the overall four-bar linkage which governs the response of each steering wheel to a given amount of handlebar turning. Therefore a change in this included angle could be compensated for by corresponding dimensional changes of the arms 56a, 56b; the rod members 48a, 48b; the link members 47a, 47b and the length of bars 49a–49d. In the exemplary embodiment, the rod members 48a and 48b each measure approximately 17 inches (43 cm), the bars 49a–49d approximately 18 inches (45 cm), the arms 56a, 56b approximately 2 inches (50.8 mm) and the link members 47a, 47b approximately 1.5 inches (38.1 mm).

The benefit to be derived from having different degrees of turning of the two front steering wheels 28 and 29 is that both wheels have rolling motion throughout all steering maneuvers and paths rather than one or the other of the two wheels being susceptible to some type of sliding motion. This means better balance and stability to conveyance 20 and minimizes the chances of tipping or turning over. Of course, some of this improved stability and balance is due to the two front steering wheels, but even with two front steering wheels, if one of these wheels did not actively engage the ground with rolling motion, there would be great likelihood of tipping over. Another factor contributing to the overall stability is that wheel fork assemblies 31 and 32 and thus wheels 28 and 29 which are attached are arranged with a 2.5 degree camber as is illustrated by angles 64 and 65 in FIG. 3.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A three-wheel conveyance comprising:
    an integral frame member including a rear wheel support and a front center post;
    handlebars assembled to said front center post;
    a rear wheel retained by said rear wheel support;
    a wheel fork support assembly clamped about said center post and including two wheel forks, each arranged with a center pivot stem and a positive camber and located at opposite ends of said wheel fork support assembly;
    two front steering wheels, each wheel being retained by a different one of said two wheel forks;
    a center steering assembly comprising:
        (a) a handlebar bracket attached to said front center post and retaining said handlebars for steering said three-wheel conveyance; and
        (b) a center steering link rigidly joined to said handlebar bracket;
    two pivot links, one link being rigidly attached to the top of said center pivot stem of each wheel fork;
    a first connecting rod connecting together one of said two pivot links with a first side of said center steering link;
    a second connecting rod connecting together the other of said two pivot links with a second opposite side of said center steering link, said connecting rods in combination with said center steering link transferring steering motion from said handlebars to said two front steering wheels; and
    a plurality of spherical connectors arranged for providing the connections at each end of said two connecting rods.

2. The three-wheel conveyance of claim 1 wherein said center steering link includes a pair of link arms arranged in a "V" shape, said pair of link arms defining an included angle of between 45 and 55 degrees.

3. A conversion kit for converting a bicycle into a three-wheel conveyance, the bicycle having a rear wheel, a front wheel fork and corrresponding front wheel, a frame having a center post and connecting together the two wheels and handlebars for steering the front wheel, said conversion kit comprising:
    a first wheel fork assembly suitably arranged for connection to a bicycle wheel axle and including a center pivot stem for turning said first wheel fork assembly;
    a first pivot link rigidly attached to the top of said center pivot stem of said first wheel fork assembly;
    a second wheel fork assembly suitable arranged for connection to a bicycle wheel axle and including a center pivot stem for turning said second wheel fork assembly;
    a second pivot link rigidly attached to the top of said center pivot stem of said second wheel fork assembly;
    a connecting member used in place of the front wheel fork which is removed, said connecting member being joined at opposite ends to a different one of said wheel fork assemblies and including a bracket portion between said opposite ends for connection to said frame, the connection of said connecting member to each of said wheel fork assemblies defining an acute included angle such that each wheel fork assembly has a positive camber;

a center steering assembly comprising:
- (a) a handlebar bracket for rigid retention of said handlebars, said handlebar bracket being suitably adapted to be pivotally secured to the center post of said frame; and
- (b) a center steering link rigidly joined to said handlebar bracket between said center post and said handlebars; and two substantially horizontal rod members, each having two spherical connectors, one at each end, one of said rod members connecting one side of said center steering link to said first pivot link, the other rod member connecting the other side of said center steering link to said second pivot link, the cooperating combination of rod members, center steering link and pivot links creating two substantially symmetrical linkage arrangements, each of which includes one pivot link, one side of the center steering link and one rod member, said two linkage arrangements being disposed on opposite sides of said frame.

4. The conversion kit of claim 3 wherein said center steering link includes a pair of link arms arranged in a "V" shape, said pair of link arms defining an included angle of between 45 and 55 degrees.

5. The conversion kit of claim 3 which further includes a second front wheel having a size and shape substantially equivalent to said front wheel of the bicycle.

6. The conversion kit of claim 3 wherein said bracket portion is U-shaped and adapted for clamping around the center post of said frame, and said conversion kit further including two spacers disposed on opposite sides of said center post and between said center post and said U-shaped bracket portion.

* * * * *